(12) United States Patent
Kwon et al.

(10) Patent No.: US 9,312,756 B2
(45) Date of Patent: Apr. 12, 2016

(54) CHARGE PUMP SYSTEM AND CHARGE PUMP PROTECTION CIRCUIT

(71) Applicant: Samsung Electro-Mechanics Co., Ltd., Suwon (KR)

(72) Inventors: Yong Il Kwon, Suwon (KR); Tah Joon Park, Suwon (KR); Ui Jong Song, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/481,556

(22) Filed: Sep. 9, 2014

(65) Prior Publication Data

US 2015/0364992 A1 Dec. 17, 2015

(30) Foreign Application Priority Data

Jun. 16, 2014 (KR) ........................ 10-2014-0073031

(51) Int. Cl.
*G05F 3/02* (2006.01)
*G05F 1/10* (2006.01)
*H02M 3/07* (2006.01)

(52) U.S. Cl.
CPC ..................................... *H02M 3/07* (2013.01)

(58) Field of Classification Search
CPC . H02M 3/073; H02M 3/07; H02M 2003/077; G11C 5/145; G05F 3/205
USPC ....................................... 327/536; 363/59–60
See application file for complete search history.

(56) References Cited

U.S. PATENT DOCUMENTS

| 5,999,475 | A | 12/1999 | Futatsuya et al. |
| 8,503,203 | B1 * | 8/2013 | Szczeszynski et al. .......... 363/60 |
| 8,724,353 | B1 * | 5/2014 | Giuliano et al. ................. 363/60 |
| 2013/0077411 | A1 * | 3/2013 | Nguyen et al. ........... 365/185.23 |
| 2013/0241630 | A1 | 9/2013 | Klein et al. |

FOREIGN PATENT DOCUMENTS

| KR | 1999-023081 | 3/1999 |
| KR | 10-2005-0002785 | 1/2005 |

* cited by examiner

*Primary Examiner* — Quan Tra
(74) *Attorney, Agent, or Firm* — NSIP Law

(57) ABSTRACT

A charge pump system may include a charge pump including a plurality of boosting units boosting an input voltage input to an input terminal multiple times depending on clock signals and outputting the boosted voltage to an output terminal; and a charge pump protection circuit including a series resistor unit disposed between the output terminal and a ground and including a plurality of resistors connected to each other in series. A portion of the plurality of resistors are disposed in parallel to a portion of the plurality of boosting units.

12 Claims, 5 Drawing Sheets

CHARGE PUMP SYSTEM AND CHARGE PUMP PROTECTION CIRCUIT

CROSS-REFERENCE TO RELATED APPLICATION

This application claims the benefit of Korean Patent Application No. 10-2014-0073031 filed on Jun. 16, 2014, with the Korean Intellectual Property Office, the disclosure of which is incorporated herein by reference.

BACKGROUND

The present disclosure relates to a charge pump system and a charge pump protection circuit.

Generally, a charge pump is used to supply a voltage having a level higher than that of a power supply voltage. In detail, such a charge pump applies clock signals having a predetermined frequency (on the level of several MHz) and having a phase difference of 180 degrees therebetween to alternately charge a power supply voltage in a predetermined capacitor, thereby generating a high-level voltage.

Since a miniaturized charge pump included in a mobile device may have limitations in terms of boosting a power supply voltage, an external high voltage generating circuit capable of generating a high voltage is used in order to generate a high output voltage.

However, in the case in which an external high voltage generating circuit capable of generating a high voltage is connected to an output terminal of a charge pump, a problem in which transistors included in the charge pump break down by a voltage having a level equal to that of a withstand voltage or more may occur.

RELATED ART DOCUMENT (Patent Document 1) Korean Patent Laid-Open Publication No. 10-2005-0002785

SUMMARY

An exemplary embodiment in the present disclosure may provide a charge pump system and a charge pump protection circuit capable of solving a problem in which transistors included in the charge pump break down at the time of connecting a high voltage generating circuit to an output terminal of the charge pump.

According to an exemplary embodiment in the present disclosure, a charge pump system may include: a charge pump including a plurality of boosting units boosting an input voltage input to an input terminal multiple times depending on clock signals and outputting the boosted voltage to an output terminal; and a charge pump protection circuit including a series resistor unit disposed between the output terminal and a ground and including a plurality of resistors connected to each other in series, wherein a portion of the plurality of resistors are connected to a portion of the plurality of boosting units, in parallel.

According to an exemplary embodiment in the present disclosure, a charge pump protection circuit of protecting a charge pump including a plurality of boosting units boosting an input voltage input to an input terminal multiple times depending on clock signals and outputting the boosted voltage to an output terminal may include: a series resistor unit disposed between the output terminal and a ground and including a plurality of resistors connected to each other in series, wherein a portion of the plurality of resistors are connected to a portion of the plurality of boosting units, in parallel.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
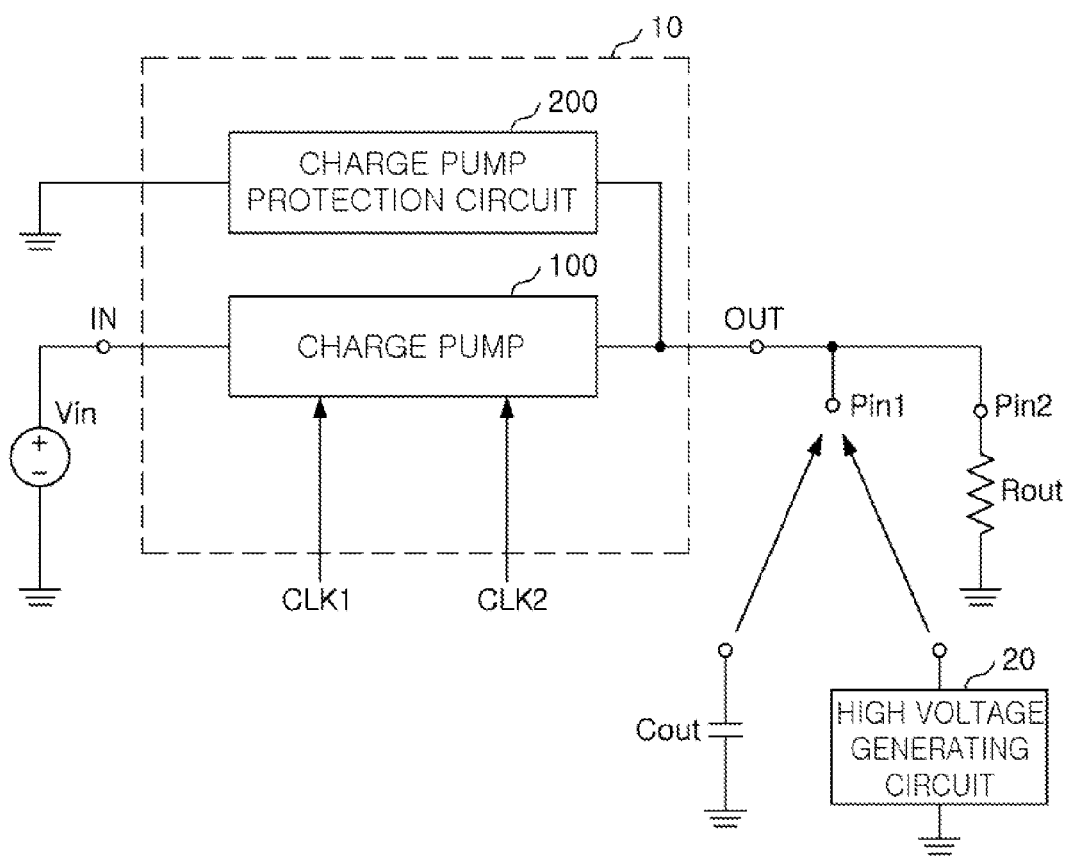
FIG. 1 is a block diagram schematically illustrating a charge pump system according to an exemplary embodiment in the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a block diagram schematically illustrating a charge pump system 10 according to an exemplary embodiment of the present disclosure.

Referring to FIG. 1, the charge pump system 10 according to an exemplary embodiment of the present disclosure may include a charge pump 100 and a charge pump protection circuit 200.

The charge pump 100 may include a plurality of boosting units, which boost an input voltage Vin input to an input terminal IN multiple times depending on clock signals CLK1 and CLK2 provided from the outside of the charge pump and output output voltages to an output terminal OUT.

The charge pump protection circuit 200 may protect elements included in the charge pump 100 so as not to be broken down when a high voltage generating circuit 20 connected to the output terminal OUT is operated.

Figure 2:
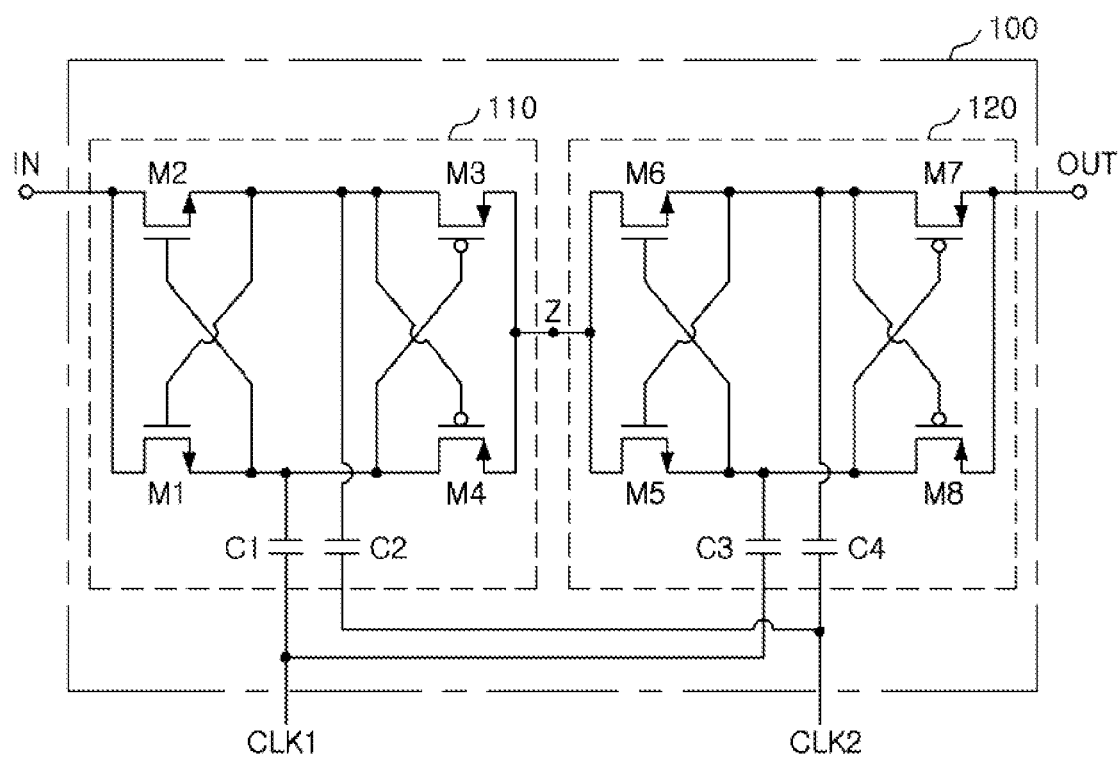
FIG. 2 is a circuit diagram illustrating a charge pump used in the charge pump system according to an exemplary embodiment in the present disclosure in detail.

FIG. 2 is a circuit diagram illustrating a charge pump 100 used in the charge pump system 10 according to an exemplary embodiment of the present disclosure in detail. Referring to FIG. 2, the charge pump 100 may include a first boosting unit 110 and a second boosting unit 120.

Although FIG. 2 illustrates the case in which the charge pump 100 includes two boosting units 110 and 120, this has been schematically illustrated for convenience of explanation. According to the present exemplary embodiment, the charge pump 100 may also include three or more boosting units. Hereinafter, the case in which the charge pump 100 includes the two boosting units 110 and 120 will be described for convenience of explanation.

The first boosting unit 110 may include n-type transistors M1 and M2, p-type transistors M3 and M4, and pumping capacitors C1 and C2, and the second boosting unit 120 may include n-type transistors M5 and M6, p-type transistors M7 and M8, and pumping capacitors C3 and C4, similar to the first boosting unit 110.

In the first boosting unit 100, the transistors M1 and M4 and the capacitor C1 may configure one pumping circuit, and the transistors M2 and M3 and the capacitor C3 may configure another pumping circuit.

A connection node between gates of the transistors M1 and M4 may be connected to one end of the capacitor C2 to which a source of the transistor M2 and a drain of the transistors M3 are connected.

A connection node between gates of the transistors M2 and M3 may be connected to one end of the capacitor C2 to which a source of the transistor M1 and a drain of the transistors M2 are connected.

A connection node between drains of the transistors M1 and M2 may be connected to an input terminal IN to which an input voltage Vin is applied, and a connection node between sources of the transistors M3 and M4 may be connected to the second boosting unit 120. Clock signals CLK1 and CLK2 provided from an external oscillator may be applied to the other ends of the capacitors C1 and C2, respectively.

The clock signals CLK1 and CLK2 may be clock signals having a phase difference of 180 degrees therebetween and having the same cycle. When the clock signal CLK1 is in a high state, the clock signal CLK2 may be in a low state, and when the clock signal CLK1 is in a low state, the clock signal CLK2 may be in a high state.

In the case in which the clock signal CLK1 is in the high state and the clock signal CLK2 is in the low state, the transistor M1 may be turned off, the transistor M2 may be turned on, the transistor M3 may be turned off, and the transistor M4 may be turned on. Accordingly, the input voltage Vin applied to the input terminal IN may be charged in the capacitor C2 through the transistor M2, and a voltage charged in the capacitor C1 may be discharged to thereby be transferred to the second boosting unit 120.

In the case in which the clock signal CLK1 is in the low state and the clock signal CLK2 is in the high state, the transistor M1 may be turned on, the transistor M2 may be turned off, the transistor M3 may be turned on, and the transistor M4 may be turned off. Accordingly, the input voltage Vin applied to the input terminal IN may be charged in the capacitor C1 through the transistor M1, and the voltage charged in the capacitor C2 may be discharged to thereby be provided to the second boosting unit 120.

In this case, a voltage transferred from the first boosting unit 110 to the second boosting unit 120 may correspond to a voltage obtained by subtracting a voltage level of the clock signal CLK1 or CLK2 from the voltage charged in the capacitor C1 or C2.

The second boosting unit 120 may also perform an operation similar to that of the first boosting unit 110, and an output voltage Vout generated by the second boosting unit 120 and output to the output terminal OUT during a period in which the clock signals are applied may be represented by the following Mathematical Expression 1. In Mathematical Expression 1, N indicates the number of boosting units, Vclk indicates a voltage level of the clock signals CLK1 and CLK2, C indicates capacitance of the pumping capacitors C1 to C4, ΔD indicates a voltage drop level occurring in each of the first and second boosting units 110 and 120, Iout indicates a current flowing in a load resistor Rout, and f indicates a frequency of the clock signals CLK1 and CLK2.

[Mathematical Expression 1]
$$Vout = (Vin - \Delta D) + N * (\Delta V - \Delta D)$$
$$\Delta V = Vclk - \frac{Iout}{f * C}$$

Again referring to FIG. 1, the output terminal OUT of the charge pump 100 may be connected to a plurality of pins Pin1 and Pin2. In the case in which the output voltage is output from the charge pump 100, an output capacitor Cout is connected to a first pin Pin1, such that the output voltage may be smoothed and then be transferred to the load resistor Rout connected to a second pin Pin2.

However, in the case in which the load resistor Rout requires a voltage equal to or higher than a voltage in a range that may be output from the charge pump 100, an operation of the charge pump 100 may be stopped, and the high voltage generating circuit 20 may be connected to the first pin Pin1 to provide the voltage required by the load resistor Rout. That is, the charge pump 100 and the high voltage generating circuit 20 may be selectively operated.

Figure 3:
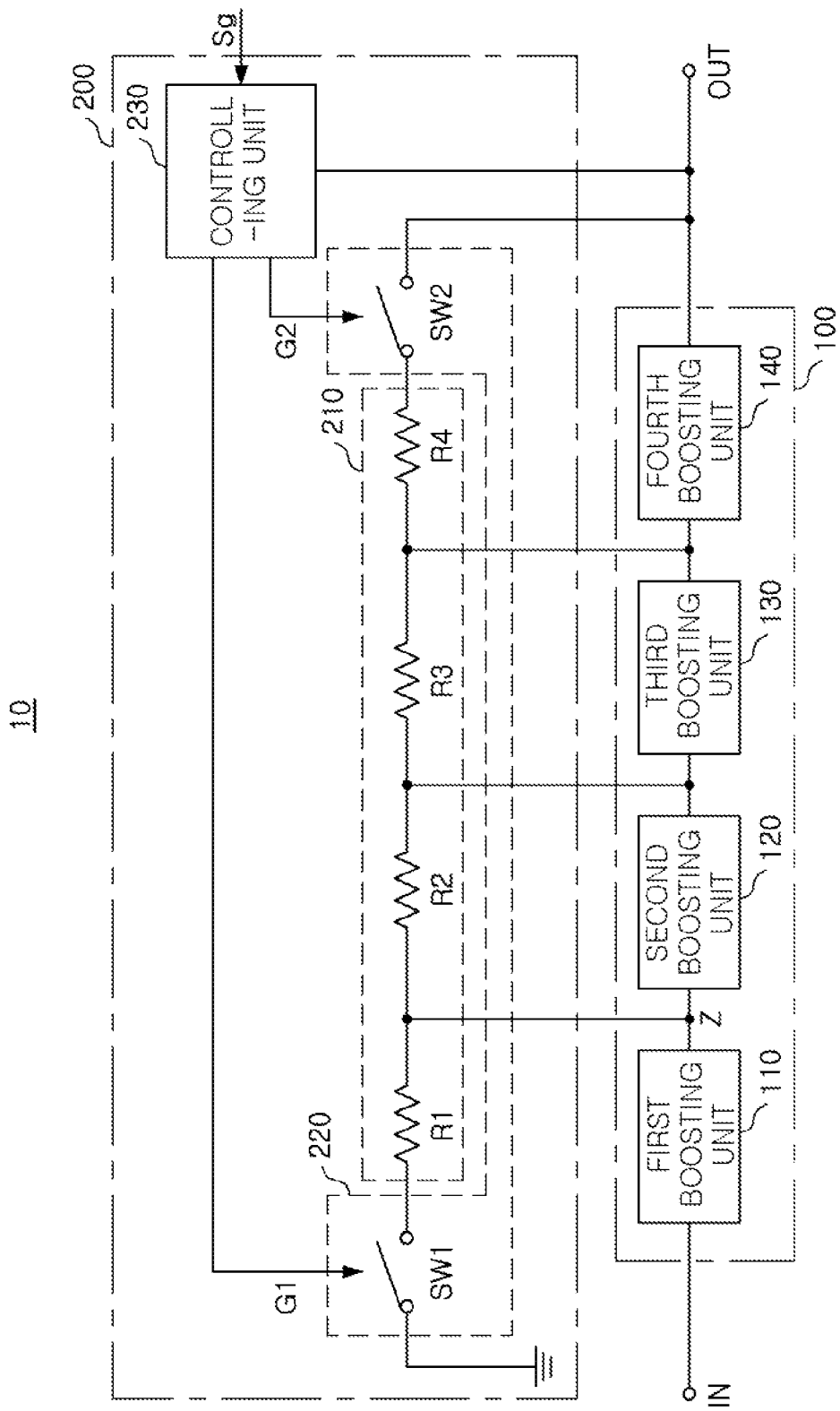
FIG. 3 is a circuit diagram illustrating a charge pump protection circuit used in the charge pump system according to an exemplary embodiment in the present disclosure in detail.

FIG. 3 is a circuit diagram illustrating a charge pump protection circuit 200 used in the charge pump system 10 according to an exemplary embodiment of the present disclosure in detail.

Although the case in which the charge pump 100 includes four boosting units 110 to 140 is illustrated in FIG. 3, the charge pump 100 may include a plurality of boosting units as described above.

The charge pump protection circuit 200 may include a series resistor unit 210, a switch unit 220, and a controlling unit 230.

The series resistor unit 210 may include a plurality of resistors R1 to R4 connected to each other in series, wherein the number of resistors R1 to R4 may be the same as that of boosting units 110 to 140 included in the charge pump 100.

A portion of the plurality of boosting units 110 to 140 may correspond to a portion of the plurality of resistors R1 to R4 in a one-to-one scheme and be connected to a portion of the plurality of resistors R1 to R4 in parallel. In more detail, boosting units, except for a boosting unit connected to the input terminal IN, and a boosting unit connected to the output terminal OUT among the plurality of boosting units 110 to 140 may be connected to the plurality of resistors, respectively, in parallel. That is, second and third boosting units 120 and 130, except for a first boosting unit 110 connected to the input terminal IN, and a fourth boosting unit 140 connected to the output terminal OUT among the plurality of boosting units 110 to 140 may correspond to second and third resistors R2 and R3 among the plurality of resistors R1 to R4, respectively, and be connected to the second and third resistors R2 and R3, respectively, in parallel.

The switch unit 220 may include a first switch SW1 and a second switch SW2. The first switch SW1 may be disposed between one end of the series resistor unit 210 and a ground, and the second switch SW2 may be disposed between the other end of the series resistor unit 210 and the output terminal OUT.

The controlling unit 230 may control the switch unit 220 depending on a control signal Sg input from the outside of the charge pump. In detail, the controlling unit 230 may generate switching signals G1 and G2 depending on the control signal Sg input from the outside of the charge pump, wherein the switching signals G1 and G2 may be provided to the switch unit 220.

The controlling unit 230 may control the first and second switches SW1 and SW2 of the switch unit 220 to be turned on in the case in which the high voltage generating circuit 20 connected to the output terminal OUT is operated and may control the first and second switches SW1 and SW2 of the switch unit 220 to be turned off in the case in which the high voltage generating circuit 20 is disconnected from the output terminal OUT and the charge pump 100 is operated.

In the case that ΔV of Mathematical Expression 1 drops to a value less than X % due to an influence depending on the second and third resistors R2 and R3 among the plurality of resistors R1 to R4 of the series resistor unit 210 when the first and second switches SW1 and SW2 of the switch unit 220 are turned off, a resistance value R of the plurality of resistors R1 to R4 may be designed as follows. In Mathematical Expression 2, $I_N$ indicates a current flowing in each of the second and third resistors R2 and R3, Vclk indicates a voltage level of the clock signals CLK1 and CLK2, C indicates capacitance of the pumping capacitors C1 to C4, and f indicates a frequency of the clock signals CLK1 and CLK2.

$$\text{V}clk - \frac{I_N}{f*C} \geq (1 - X/100), I_N = \frac{\text{V}clk}{R} \quad \text{[Mathematical Expression 2]}$$

$$\text{V}clk * \left(1 - \frac{1}{f*C*R}\right) \geq (1 - X/100)$$

$$R \geq \frac{\text{V}clk}{(\text{V}clk - (1 - X/100))*f*C}$$

Figure 4:
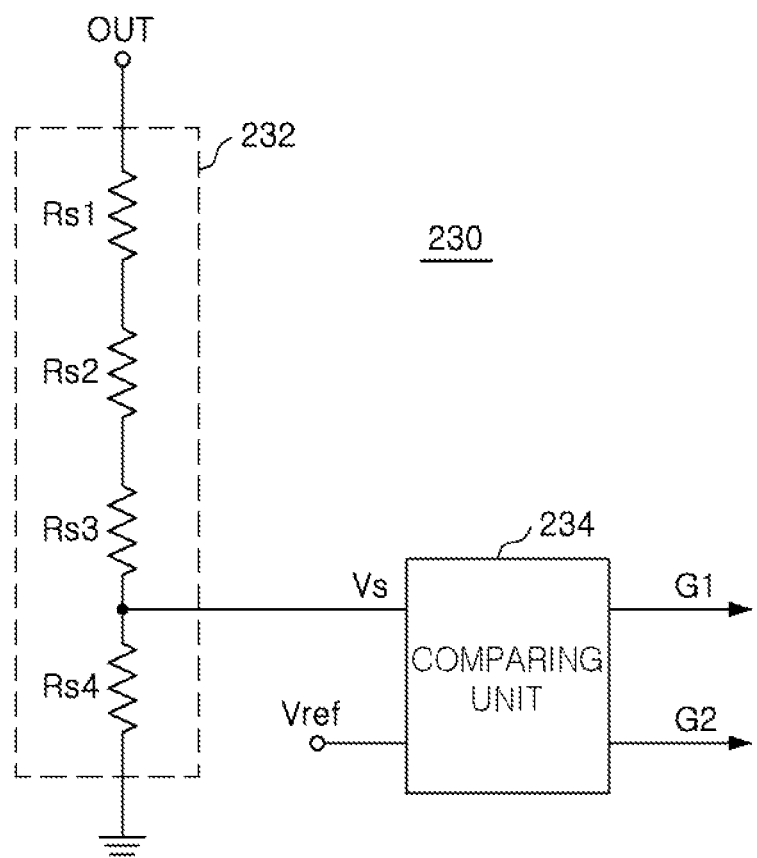
FIG. 4 is a view illustrating a charge pump system including a charge pump protection circuit according to another exemplary embodiment in the present disclosure.

Here, when considering a voltage drop due to all of the plurality of resistors R1 to R4 of the series resistor unit 210, the charge pump protection circuit 200 of FIG. 3 may be changed into a charge pump protection circuit 200 of FIG. 4.

FIG. 4 is a view illustrating a charge pump system 10 including a charge pump protection circuit 200 according to another exemplary embodiment of the present disclosure.

The charge pump protection circuit 200 of FIG. 4 may include a series resistor unit 210 disposed between the output terminal OUT and the ground. The series resistor unit 210 may include a plurality of resistors R1 to R4 connected to each other in series, wherein the number of resistors R1 to R4 may be the same as that of boosting units 110 to 140 included in the charge pump 100.

A portion of the plurality of resistors R1 to R4 may be connected to a portion of the plurality of boosting units 110 to 140 in parallel. In more detail, resistors, except for a resistor connected to the ground among the plurality of resistors R1 to R4, may correspond to boosting units, except for a boosting unit connected to the input terminal IN among the plurality of boosting units 110 to 140, in a one-to-one scheme and may be connected to the boosting units, except for the boosting unit connected to the input terminal IN, in parallel. That is, the second to fourth resistors R1 and R4 may be connected to the second to fourth boosting units 120 to 140, respectively, in parallel, and the first resistor R1 may be connected to the ground.

Figure 5:
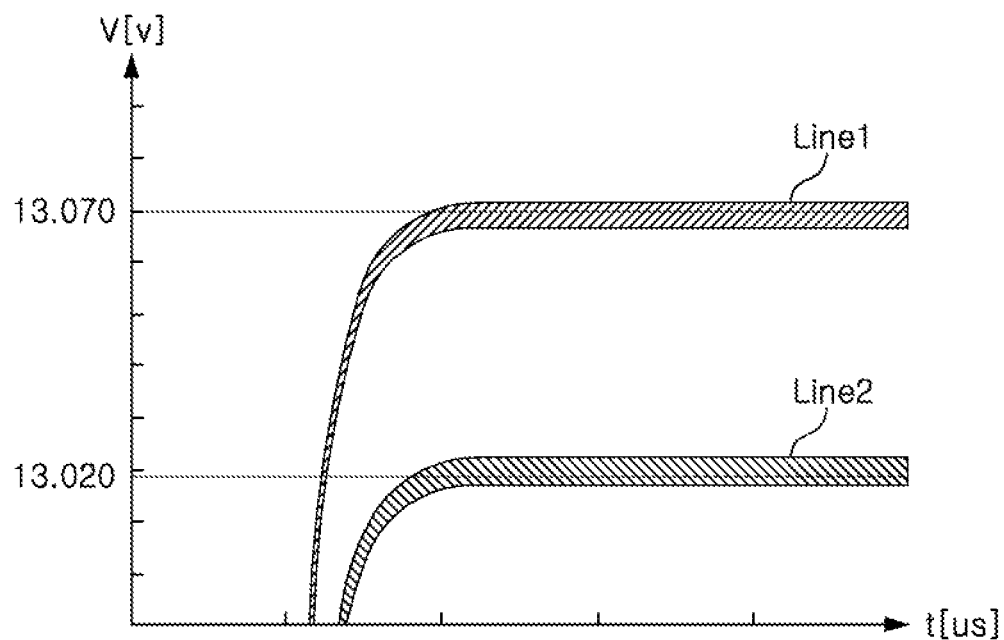
FIG. 5 is a simulation graph when the charge pump is operated.

FIG. 5 is a simulation graph when the charge pump is operated. FIG. 5 is also a graph illustrating a comparison of a voltage of Line 1 of the output terminal OUT in the case in which the charge pump protection circuit 200 is not prepared with a voltage Line 2 of the output terminal OUT in the case in which the charge pump protection circuit 200 is prepared, when the charge pump 100 of the charge pump system 10 is operated.

It may be appreciated that a voltage level of the output terminal OUT in the case in which the charge pump protection circuit 200 is present drops as compared with a voltage level of the output terminal OUT in the case in which the charge pump protection circuit 200 is not present drops, by about 50 mV, a relatively small difference, such that the charge pump 100 may be normally operated without basic characteristics thereof being significantly affected by the charge pump protection circuit 200 even though the charge pump protection circuit 200 is present.

Figure 6:
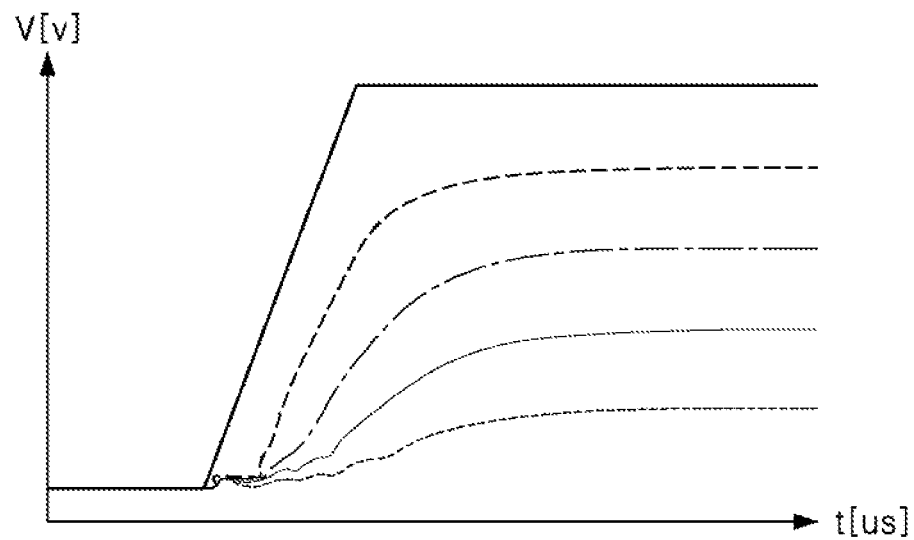
FIG. 6 is a simulation graph when a high voltage generating circuit connected to an output terminal of the charge pump is operated.

FIG. 6 is a simulation graph illustrating a state in which a high voltage generating circuit 20 connected to an output terminal of the charge pump is operated. Referring to FIG. 6, which sequentially illustrates a voltage of the output terminal OUT and voltages at each of connection nodes between a plurality of resistors included in the series resistor unit 210 of FIG. 3 in the case in which the number of resistors is 5, voltages applied across the plurality of resistors are constantly maintained. As a result, even in the case in which the high voltage generating circuit 20 connected to the output terminal of the charge pump is operated, the transistors included in the charge pump are not protected, but may be protected.

As set forth above, the charge pump system and the charge pump protection circuit according to an exemplary embodiment of the present disclosure may prevent the transistors included in the charge pump from being broken down.

While exemplary embodiments have been shown and described above, it will be apparent to those skilled in the art that modifications and variations could be made without departing from the spirit and scope of the present disclosure as defined by the appended claims.

What is claimed is:
1. A charge pump system comprising:
a charge pump including a plurality of boosting units boosting an input voltage input to an input terminal multiple times depending on clock signals and outputting the boosted voltage to an output terminal; and
a charge pump protection circuit including a series resistor unit disposed between the output terminal and a ground and including a plurality of resistors connected to each other in series,
wherein a portion of the plurality of resistors are connected to a portion of the plurality of boosting units, in parallel.
2. The charge pump system of claim 1, wherein a high voltage generating circuit generating a high voltage is connected to the output terminal, and the charge pump and the high voltage generating circuit are selectively driven.
3. The charge pump system of claim 1, wherein boosting units, except for a boosting unit connected to the input terminal among the plurality of boosting units, correspond to a portion of the plurality of resistors, respectively, in a one-to-one scheme and are connected to a portion of the plurality of resistors, respectively, in parallel.
4. The charge pump system of claim 2, wherein the charge pump protection circuit further includes a switch unit including a first switch disposed between the ground and one end of the series resistor unit and a second 5 switch disposed between the output terminal and the other end of the series resistor unit.
5. The charge pump system of claim 4, wherein the charge pump protection circuit further includes a controlling unit providing a switching signal to the switch unit depending on a control signal input from the outside.

6. The charge pump system of claim 5, wherein the controlling unit controls the first and second switches to be turned on in the case in which the high voltage generating circuit is operated and controls the first and second switches to be turned off in the case in which the charge pump is operated.

7. A charge pump protection circuit of protecting a charge pump including a plurality of boosting units boosting an input voltage input to an input terminal multiple times depending on clock signals and outputting the boosted voltage to an output terminal, comprising:
   a series resistor unit disposed between the output terminal and a ground and including a plurality of resistors connected to each other in series,
   wherein a portion of the plurality of resistors are connected to a portion of the plurality of boosting units, in parallel.

8. The charge pump protection circuit of claim 7, wherein a high voltage generating circuit generating a high voltage is connected to the output terminal, and the charge pump and the high voltage generating circuit are selectively driven.

9. The charge pump protection circuit of claim 8, wherein boosting units, except for a boosting unit connected to the input terminal among the plurality of boosting units, correspond to a portion of the plurality of resistors, respectively, in a one-to-one scheme and are disposed in parallel to a portion of the plurality of resistors, respectively.

10. The charge pump protection circuit of claim 9, further comprising a switch unit including a first switch disposed between the ground and one end of the series resistor unit and a second switch disposed between the output terminal and the other end of the series resistor unit.

11. The charge pump protection circuit of claim 10, further comprising a controlling unit providing a switching signal to the switch unit depending on a control signal input from the outside.

12. The charge pump protection circuit of claim 11, wherein the controlling unit controls the first and second switches to be turned on in the case in which the high voltage generating circuit is operated and controls the first and second switches to be turned off in the case in which the charge pump is operated.

* * * * *